United States Patent
Arai

(10) Patent No.: US 7,486,593 B2
(45) Date of Patent: Feb. 3, 2009

(54) METHOD OF WRITING INTO UNWRITTEN REGION OF OPTICAL DISC, OPTICAL DISC WRITING DEVICE, OPTICAL DISC, AND PROGRAM FOR WRITING DATA ON OPTICAL DISC

(75) Inventor: Toru Arai, Tokyo (JP)

(73) Assignee: NEC Corporation, Tokyo (JP)

( * ) Notice: Subject to any disclaimer, the term of this patent is extended or adjusted under 35 U.S.C. 154(b) by 960 days.

(21) Appl. No.: 10/869,933

(22) Filed: Jun. 18, 2004

(65) Prior Publication Data

US 2004/0264232 A1    Dec. 30, 2004

(30) Foreign Application Priority Data

Jun. 19, 2003    (JP) ............................. 2003-174367
Jun. 17, 2004    (JP) ............................. 2004-180170

(51) Int. Cl.
*G11B 21/08*    (2006.01)

(52) U.S. Cl. ................................. 369/30.04; 369/53.24
(58) Field of Classification Search ....................... None
See application file for complete search history.

(56) References Cited

U.S. PATENT DOCUMENTS

| | | | |
|---|---|---|---|
| 5,802,028 A | 9/1998 | Igarashi | |
| 5,848,038 A | 12/1998 | Igarashi | |
| 6,061,313 A | 5/2000 | Shigemori | |
| 6,243,338 B1 | 6/2001 | Mine | |
| 2004/0090886 A1 | 5/2004 | Sasaki | |
| 2007/0133371 A1* | 6/2007 | Hirokane et al. | 369/94 |
| 2008/0080347 A1* | 4/2008 | Nakagawa et al. | 369/53.18 |

FOREIGN PATENT DOCUMENTS

| | | |
|---|---|---|
| JP | 05-101543 | 4/1993 |
| JP | 07-014301 | 1/1995 |
| JP | 08-147110 | 6/1996 |
| JP | 10-289527 | 10/1998 |
| JP | 11-045508 | 2/1999 |
| JP | 11-086418 | 3/1999 |
| JP | 11-144374 | 5/1999 |
| JP | 2004-145954 | 5/2004 |

* cited by examiner

*Primary Examiner*—Paul Huber
(74) *Attorney, Agent, or Firm*—Foley & Lardner LLP

(57) ABSTRACT

To surely write data readably into a region of a designated address even if an unwritten region exists ahead of the designated address. A step of registering beforehand an address map attached to an unwritten region of the data writing area; a step of judging whether an address located ahead of the designated address for writing data is an unwritten region or a written region; and a step of writing data into the data writing area of the optical disc based on the judgment result, are included. In the writing step, if the address located ahead of the designated address is judged as a written region, data writing is performed starting from a region of the designated address, and if the address located ahead of the designated address is judged as an unwritten region, the data writing is performed to unwritten regions including the aforementioned unwritten region.

16 Claims, 5 Drawing Sheets

METHOD OF WRITING INTO UNWRITTEN REGION OF OPTICAL DISC, OPTICAL DISC WRITING DEVICE, OPTICAL DISC, AND PROGRAM FOR WRITING DATA ON OPTICAL DISC

BACKGROUND OF THE INVENTION

1. Field of the Invention

The present invention relates to an optical disc writing method for writing data into a data writing area of an optical disc by controlling an optical disc device, and to an optical disc writing program for carrying out the writing method.

2. Related Art

Conventionally, in an optical disc that data can be written and read, address data may be embedded beforehand on the disc surface of the optical disc in order to specify a part where data is written into or read out. As optical discs of this kind, one conforming to a standard in which a meandering groove (hereinafter referred to as a wobble) is provided and address data is embedded by being synchronized to the meandering form of the wobble so as to be modulated, and one conforming to a standard in which a header for embedding the address data is formed for each writing unit, are known (see Japanese Patent Applications Laid-open No. 5-101543, Laid-open No. 7-14301, Laid-open No. 11-45508, Laid-open No. 11-86418, and Laid-open No. 11-144374).

In an optical disc with a wobble, when data is first written into a part where data has never been written on the optical disc, the data writing part is specified based on the address data embedded in the wobble, and the data writing is initiated.

As described above, in a rewritable optical disc, the data writing part is specified based on the address data embedded in the wobble, and the data writing is carried out on a condition that a block located ahead of a block into which the data should be written is the one where data has never been written. Then, reading of the written data is performed to the block into which the data has been written.

However, there is a problem that a block into which the data has been written, within the unwritten region of the optical disc, cannot be searched for, based on the address data in the wobble.

The reasons are as follows. For example, since writing is carried out by synchronizing with the address data embedded in the wobble, the starting point of the writing is a linking position of the block into which the data is written. Therefore, when the data in the block is read out, there may be a case that the data is taken without being synchronized with, for example, a frame SYNC which is synchronization information of the data, so that a correction of data such as an ECC is not performed.

SUMMARY OF THE INVENTION

It is therefore an object of the invention to provide a method of writing into an unwritten region of an optical disc and an optical disc recording program for realizing writing of data into an unwritten region in such a manner that the data will not be taken in, when read out, without being synchronized with, for example, a frame SYNC which is synchronization information of the written data.

In order to achieve the aforementioned object, a method of writing into an unwritten region of an optical disc for writing data, provided from a host device, into a data writing area of the optical disc, comprises: a judging step for judging whether an address located ahead of a designated address for writing data is an unwritten region or a written region; and a writing step for writing data into the data writing area of the optical disc based on a judgment result of the judging step. In the writing step, if the address located ahead of the designated address is judged as a written region, data writing is performed starting from a region of the designated address, and if the address located ahead of the designated address is judged as an unwritten region, dummy data is written into a region of an address located ahead of the designated address, and continuously, the data provided from the host device is written into the region of the designated address.

First, an address located ahead of an address into which the data should be written is judged whether it is an unwritten region or a written region. Then, based on the judgment result of the judging step, data writing into the data writing area of the optical disc is carried out.

Further, in the present invention, if the address located ahead of the designated address is judged as a written region, data writing is performed starting from a region of the designated address, and if the address located ahead of the designated address is judged as an unwritten region, the data writing is performed to unwritten regions including the aforementioned unwritten region, in the writing step.

In the case that the address located ahead of the designated address is judged as an unwritten region, data written into an unwritten region following the aforementioned unwritten region is data which is provided from a host device and should be written on the optical disc, and data written into the unwritten region of the address located ahead of the designated address is dummy data for reading out the data provided from the host device. It is important that the dummy data is written as a continuation of the data provided from the host device, and includes address information and a frame SYNC, or synchronizing information, which are required for collating the address of the data written on the disc with the address data embedded at the reference position of the disc. The address, which is a writing unit of the dummy data, may be set in a block unit or in a bit unit.

Therefore, according to the present invention, data writing is performed starting from a region of the designated address when the address located ahead of the designated address is judged as a written region. Therefore, when reading out the written data based on the designated address, the location of the designated address can be specified on the basis of the address of the written region located ahead of the designated address, whereby the data, provided from the host device, written in the unwritten region can be surely read out.

As described above, in a case that a part, in the data writing area, located ahead of a part into which the data is written is an unwritten region, that is, in a case that the unwritten regions are in the continuous relationship and the data is written into the latter unwritten region which follows the preceding unwritten region, there is a problem that the normal data in the latter unwritten region cannot be read out.

In the present invention, if an address located ahead of the designated address is judged as an unwritten region, the data is written into the regions including the unwritten region. Therefore, the data is written into the unwritten regions continuing in sequence, so that the data written in the latter unwritten region can be read out based on the address of the former unwritten region where the data is written. For example, as for data written with a gap, it is synchronized in the former region, so that the mount of the gap can be corrected. Thereby, the data, provided from the host device, written in the latter unwritten region can be surely read out.

Here, an explanation will be given for a case where "the amount of a gap can be corrected. First, demodulation of data is performed from the starting position of the sector (block).

Then, the amount of timing lag between the head position which is disc-preformatted as the reference position of the optical disc and the head position of the data provided from the host device written on the disc, is corrected with reference to the starting position of the sector. This can also be applied to a case where a gap is generated by a sector unit.

In the background format, first the data from the host device is written behind the unwritten region, and the unwritten region is formatted, then the data is written. However, data from the host device cannot be written continuously. In the present invention, it is possible to physically format dummy data as descried later. This point contains the technical significance.

Further, in the writing step of the present invention, if the address located ahead of the designated address is judged as a written region, data writing may be performed starting from a region of the designated address, and if the address located ahead of the designated address is judged as an unwritten region, data including at least one of a synchronizing signal or address information may be written into a region of an address located ahead of the designated address, and continuously, the data provided from the host device is written into the region of the designated address.

Further, the data written in the unwritten region may be written in a byte unit, or the data written in the unwritten region may be written in a block unit. Moreover, the data may be written in multiple block units including the unwritten region.

Therefore, according to the present invention, data can be written regardless of the size of the data which is written in the unwritten region, whereby the data writing area of the optical disc can be utilized effectively.

In the writing step, if the address located ahead of the designated address is judged as a written region, data writing may be performed starting from a region of the designated address, and if the address located ahead of the designated address is judged as an unwritten region, dummy data may be written into a region of an address located ahead of the designated address, and continuously, the data provided from the host device is written into the region of the designated address, and the writing may be performed in such a manner that the dummy data written in the unwritten region of the address located ahead of the designated address is physically formatted, and each time the data, which is provided from the host device and should be written into the unwritten region physically formatted, is written, the address map, attached to the unwritten region, registered in the registering step is updated.

Further, in the writing step, if the address located ahead of the designated address is judged as a written region, data writing may be performed starting from a region of the designated address, and if the address located ahead of the designated address is judged as an unwritten region, data including at least one of a synchronizing signal or address information may be written into a region of an address located ahead of the designated address, and continuously, the data provided form the host device is written into the region of the designated address, and the writing may be performed in such a manner that the data including at least one of the synchronizing signal or the address information written in the unwritten region of the address located ahead of the designated address is physically formatted, and each time the data, which is provided from the host device and should be written into the unwritten region physically formatted, is written, the address map, attached to the unwritten region, registered in the registering step is updated.

Therefore, according to the present invention, even if the data is written using the unwritten regions continuing in sequence, the former unwritten region can also be used, by being physically formatted, as a region for writing data provided from the host device. Thereby, the data writing regions of the optical disc can be effectively utilized to the utmost extent.

An optical disc writing device according to the present invention for writing data into a data writing area of the optical disc, comprises: a judging unit for judging whether an address located ahead of a designated address for writing data is an unwritten region or a written region; and a writing unit for writing data into the data writing area of the optical disc based on a judgment result by the judging unit. The device is so configured that the writing unit has such a structure as to perform: if the address located ahead of the designated address is judged as a written region, data writing starting from a region of the designated address; and if the address located ahead of the designated address is judged as an unwritten region, writing of dummy data into a region of an address located ahead of the designated address, and continuously, writing of the data provided from the host device into the region of the designated address.

The writing unit of the present invention may be so configured as to perform: if the address located ahead of the designated address is judged as a written region, data writing starting from a region of the designated address; and if the address located ahead of the designated address is judged as an unwritten region, writing of data including at least one of a synchronizing signal or address information into a region of an address located ahead of the designated address, and continuously, writing of the data provided from the host device into the region of the designated address.

A program for writing data on an optical disc, with which data provided from a host device is written into a data writing area of an optical disc according to the present invention, is preferable to be so configured as to cause an electronic device to perform: judging processing to judge whether an address located ahead of a designated address for writing data is an unwritten region or a written region; and writing processing to write the data into the data writing area of the optical disc, based on a judgment result of the judging processing; and in the writing processing, if the address located ahead of the designated address is judged as a written region, data writing is performed starting from a region of the designated address, and if the address located ahead of the designated address is judged as an unwritten region, dummy data is written into a region of an address located ahead of the designated address, and continuously, the data provided from the host device is written into the region of the designated address.

Further, a program for writing data on an optical disc, with which data provided from a host device is written into a data writing area of an optical disc, according to the present invention, may be so configured as to cause an electronic device to perform: judging processing to judge whether an address located ahead of a designated address for writing data is an unwritten region or a written region; and writing processing to write the data into the data writing area of the optical disc, based on a judgment result of the judging processing; and in the writing processing, if the address located ahead of the designated address is judged as a written region, data writing is performed starting from a region of the designated address, and if the address located ahead of the designated address is judged as an unwritten region, data including at least one of a synchronizing signal or address information is written into a region of an address located ahead of the designated address, and continuously, the data provided from the host device is written into the region of the designated address.

An optical disc of the present invention is preferable to have such a configuration that a data writing area includes: an unwritten region, a written region into which dummy data is written, and a written region into which data provided from a host device is written following the dummy data, and the dummy data is trigger data for reading out the data provided from the host device.

The data length of the dummy data is desirable to be shorter than a length of one block into which the data provided from the host device is written.

In a case of reading out data which is provided from a host device and is written on the optical disc, if the data provided from the host device is written following the dummy data written in the region of the address located ahead of the designated address, the data is read out starting from the dummy data, whereby a timing lag is corrected based on a difference between a reference position of the optical disc and a head position of the data provided from the host device. With this correction, the timing lag between the reference position and the head position of the data is eliminated.

Further, an optical disc is desirable to be so configured that a data writing area includes: an unwritten region, a written region in which data including at least one of a synchronizing signal or address information is written in a region of an address located ahead of a designated address, and a written region in which data provided from a host device is written, and the data including at least one of the synchronizing signal or the address information is trigger data for reading out the data provided from the host device. In this case, the data length of the data including at least one of the synchronizing signal or the address information is desirable to be shorter than a length of one block into which the data provided from the host device is written.

In a case of reading out data which is provided from a host device and is written on the optical disc, the data may be read out starting from the data including at least one of the synchronizing signal or the address information written in the region of the address located ahead of the designated address, whereby a timing lag is corrected based on a difference between a reference position of the optical disc and a head position of the data provided from the host device. With this correction, the timing lag between the reference position and the head position of the data is eliminated.

As described above, according to the present invention, even if the address located ahead of the designated address is judged as an unwritten region, the data is written into the regions including the unwritten region, by incorporating the optical disc writing program in a general purpose optical disc device. Thereby, the data is written into the unwritten regions continuing in sequence, so that the normal data written in the latter unwritten region can be read out based on the address of the former unwritten region where the data is written. Accordingly, the normal data written in the latter unwritten region can be surely read out.

PREFERRED EMBODIMENTS OF THE INVENTION

Next, embodiment of the present invention will be explained in detail with reference to the drawings.

Embodiment 1

Figure 1:
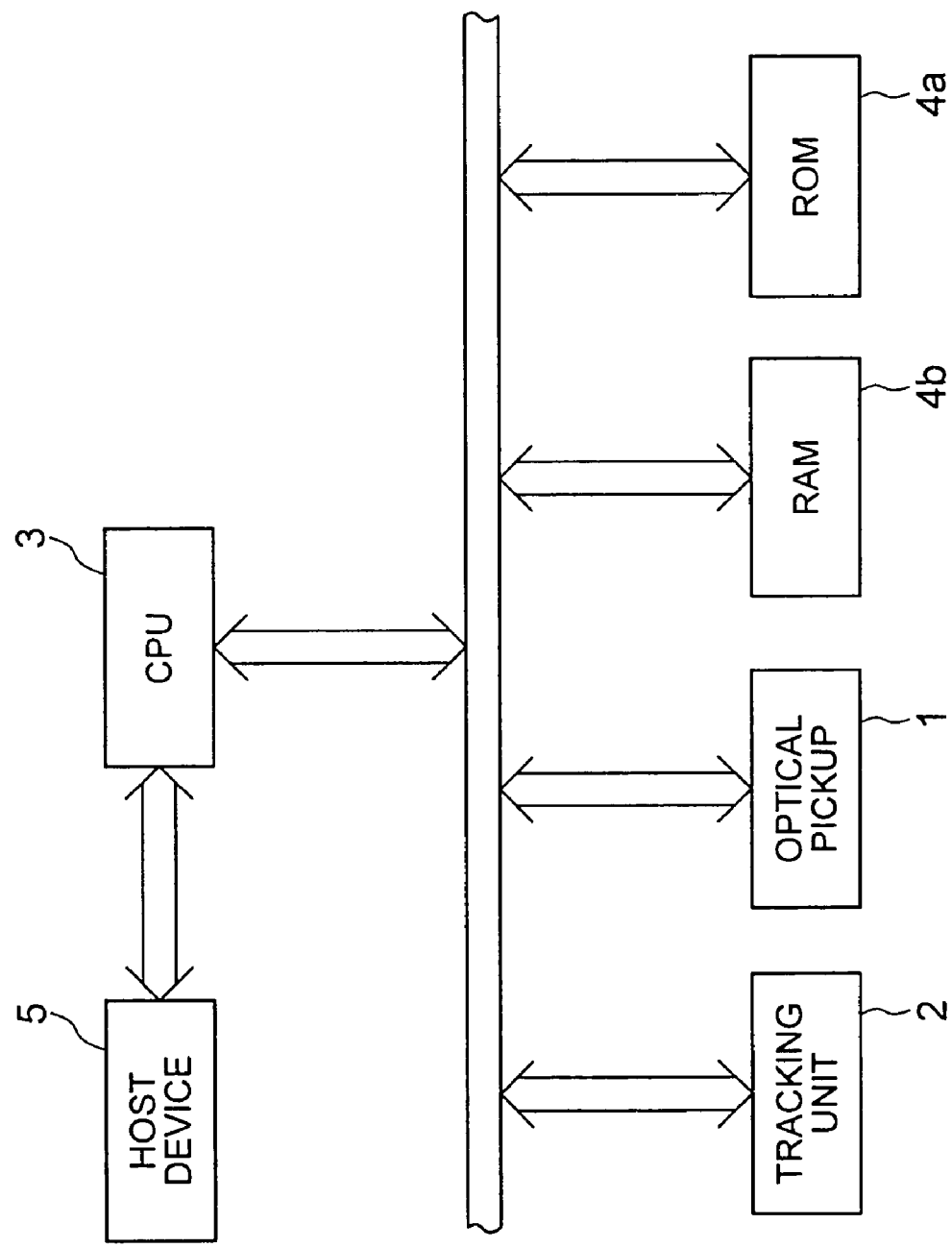
FIG. 1 is a block diagram showing a specific structure of an optical disc device according to an embodiment of the present invention.

As shown in FIG. 1, an optical disc device according to an embodiment of the present invention has a function of writing data into a data writing area of the optical disc and reading out the data written in the data writing area.

The optical disc device according to the present invention includes, as shown in FIG. 1: a CPU 3; a ROM 4a which records a program for writing data on optical disc for controlling the operation of the CPU 3 and reads out consecutively the program for writing data on optical disc based on instructions from the CPU 3; and a RAM 4b which temporarily records such information that whether the data writing area of the optical disc loaded on the drive of the optical disc device is a written region or an unwritten region, and data of an address map which is attached to the unwritten region of the data writing area. The optical disc device further includes: an optical pickup 1, as a writing unit, which writes data into a data writing area of the optical disc and reads out the data from the data writing area, a tracking unit 2 which positions the optical pickup 1 on a predetermined track located within the data writing area of the optical disc. The CPU 3, the ROM 4a, the RAM 4b and the like constitute a computer as an electronic device. Note that an electronic device, in which computation processing is performed by an MPU instead of a CPU, may be used.

A written region means a region where data has been written, within the data writing area of the optical disc, and an unwritten region means a region where data has not been written, within the data writing area of the optical disc. As an optical disc of the present invention, DVD+RW, DVD-RW, DVD+RW/R, DVD-RW/R, DVD+R or DVD-R, for example, may be used. In a case of using DVD+RW, DVD+R or DVD+RW/R is used as an optical disc, it is standardized that address data is embedded in the wobble. In a case of using DVD-RW, DVD-R or DVD-RW/R, it is standardized that address data is embedded in the LPP. Although a case where address data is embedded in the wobble is explained below as an example, the present invention can also be applied in the same way to an optical disc having a standard that address data is embedded in the LPP. Note that the wobble and the LPP (land pre pit) described above indicate reference positions of the optical disc.

The CPU 3 first properly tracks by the tracking unit 2 the optical pickup 1 to the data writing area of the optical disc, and then detects address data in the wobble scored in the optical disc, thereby defines the current position of the optical pickup 1 within the data writing area of the optical disc.

Further, when the optical disc is loaded on the drive of the optical disc device, the CPU 3 reads out address map management information about the written region and the unwritten region in the data writing area of the optical disc, which is written in the lead-in or the like, obtains the address information of the written region and the unwritten region in the data writing area of the optical disc, and temporarily registers into the RAM (memory) 4*b* the address map which is attached to the unwritten area. It is also acceptable to adopt a method in which when the optical disc is loaded on the drive of the optical disc device, the whole surface of the optical disc is analyzed beforehand, and the address data embedded in the wobble is detected, whereby the address information of the written region and the unwritten region in the data writing area of the optical disc is obtained and the address map attached to the unwritten area is temporarily registered in the RAM 4*b*.

Further, the CPU 3, when writing data into the data writing area of the optical disc, analyzes an instruction from the host device 5 and calculates an address (designated address) on the optical disc corresponding to the part into which the data is written within the data writing area. Then, the CPU 3 explores whether the region corresponding to the calculated address (designated address) is an unwritten region or a written region of the optical disc registered in the RAM 4*b*.

If the CPU 3 searches for the data writing area of the optical disc corresponding to the calculated address, or the designated address, assuming it being the unwritten area, the CPU 3 judges whether a data writing region of the optical disc corresponding to an address located ahead of the designated address is an unwritten region or a written area. In other words, the CPU 3 serves as a judging unit for judging whether an address located ahead of the designated address for writing the data is an unwritten region or a written region.

If the CPU 3 judges that the data writing area in the optical disc corresponding to the address located ahead of the designated address is an unwritten region, based on the judgment result, the CPU 3 starts writing data into the former unwritten region and into the unwritten region corresponding to the designated address following the former unwritten area. In other words, the CPU 3 works as a writing unit.

When the address located ahead of the designated address is judged as an unwritten region, the data written into an unwritten region following such an unwritten region is data, provided from the host device, which should be written on the optical disc. On the other hand, the data written into the unwritten region of the address located ahead of the designated address is dummy data used for reading out the data provided from the host device. It is important that the data from the host device is written following the dummy data, and that the dummy data includes a frame SYNC which is information synchronizing with the address information required for collating the address of the data written on the disc with the address data embedded in the wobble of the disc. The address, which is a writing unit of the dummy data, may be set in a block unit or in a bit unit. Further, the address information of the dummy data exists in the ID (identification data) part of the format defined by the standard. This ID may be marked as a Data ID in the case of DVD+R, DVD+RW, DVD+RW/R, DVD-R, DVD-RW or a DVD-RW/R.

If the CPU 3 judges that a block located ahead of the data writing part is a written region, based on the judgment result, the CPU 3 starts data writing into an unwritten region of the data writing area from the designated address.

When the data is written into the unwritten region corresponding to the designated address, the embodiment of the present invention adopts a controlling method in which a disc write is also carried out into an unwritten region located ahead of the aforementioned unwritten region at the same time. More specifically, when an optical disc is loaded on the optical disc device, the CPU 3 of the optical disc device creates an address map of the unwritten region on the optical disc. Then, when writing data onto the optical disc (performing a disc write), the CPU 3 judges whether a region, corresponding to the address located ahead of the unwritten region to which the disc write should be performed, is an unwritten region or not. If the CPU 3 judged it is an unwritten region, the CPU 3 performs physical formatting to the unwritten region and also carries out data writing. Then, the CPU 3 adopts a controlling method in which the address map of the unwritten region on the optical disc is updated at each time the physical formatting and data writing are carried out, whereby, when the data is written into the unwritten region corresponding to the designated address, the disc write is also performed at the same time into the unwritten region corresponding to the address located ahead of the unwritten region.

The aforementioned processing by the CPU 3 is executed by the CPU 3 reading out consecutively the optical disc writing program according to the present invention written in the ROM 4*a*.

The program for writing data on optical disc of the present invention, written in the ROM 4*b*, intends an optical disc writing program for writing data into the data writing area of the optical disc by controlling the optical disc device shown in FIG. 1. The program carries out: registering processing for causing an address map, which is attached to an unwritten region of the data writing area, to be registered beforehand in the memory (RAM 4*b*) of the optical disc device, judging processing for causing the judging unit (CPU 3) of the optical disc device to judge whether a region corresponding to the address located ahead of the designated address is an unwritten region or a written region, and writing processing for causing the writing unit (optical pickup 1) of the optical disc device to write data into the data writing area of the optical disc based on the judgment result of the judging step. Further, the program is so configured to control in such a manner that, during the data writing performed by the writing unit (optical pickup 1) of the optical disc device, the data writing is performed starting from the region corresponding to the designated address if the region corresponding to the address located ahead of the designated address is judged as a written region, and if a region corresponding to the address ahead of the designated address is judged as an unwritten region, the data writing is performed to the regions including the unwritten region.

With the processing by the program, there exist, in a data writing area of the optical disc, an unwritten region, a written region into which dummy data is written, and a written region into which data from the host device is written following the dummy data. The dummy data is trigger data for reading out the data provided from the host device. It is desirable that the data length of dummy data be shorter than the length of one block for writing data provided from the host device.

In the case of reading data which is provided from the host device and written on the optical disc, when demodulating the data provided from the host device, the data is read out starting from the head position of the dummy data if the data from the host device is written following the dummy data written in the region of the address located ahead of the designated address. Thereby, the timing lag between the reference position of the optical disc and the head position of the data from the host device is corrected.

Further, with the processing by the program, there may be a case where an unwritten region, and a written region where data including at least one of the synchronization signal or the address information is written in a region of the address ahead of the designated address, and a written region where data from the host device is written in the region of the designated address exist in a data writing area of the optical disc. The data including at least one of the synchronization signal or the address information is trigger data for reading out data provided from the host device. In this case, it is desirable that the data length of the data including at least one of the synchronization signal or the address information be shorter than the length of one block for writing data from the host device.

In the case of reading data provided from the host device, when demodulating the data provided from the host device, the data is read out from the head position of the dummy data if the data from the host device is written following the dummy data written in the address region positioned before the designated address. Thereby, the timing lag between the reference position of the optical disc and the head position of the data from the host device is corrected.

Figure 6:
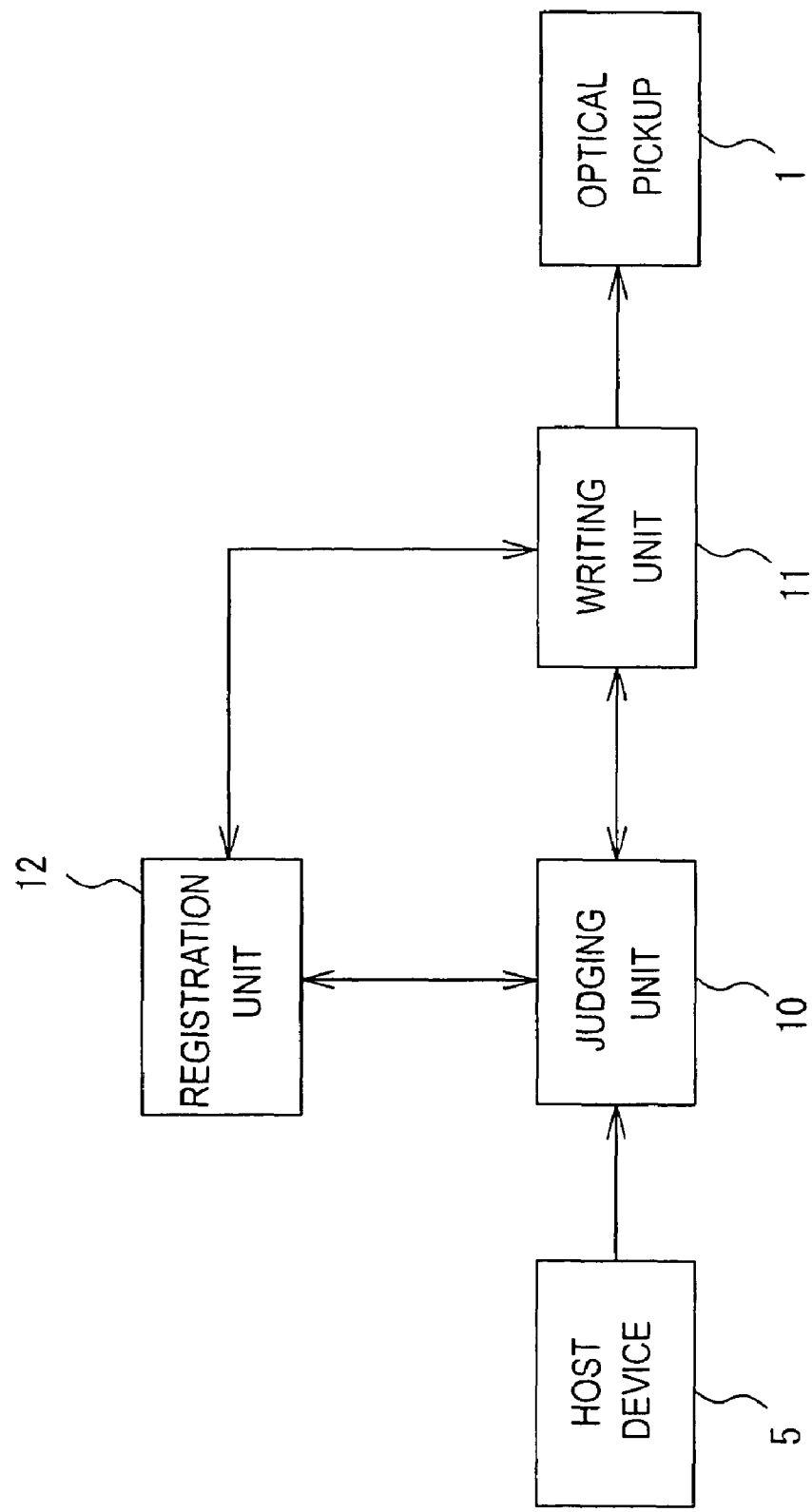
FIG. 6 is a block diagram showing the structure of the optical disc device according to the present invention.

As described above, the optical disc recording device according to the present invention includes: a judging unit 10 for judging whether the address positioned ahead of the address designated for writing the data is an unwritten region or a written region; and a writing unit 11 for writing data into a data writing area of the optical disc based on the judgment result from the judging unit 10, as shown in FIG. 6. The judging unit 10 and the writing unit 11 are formed in such a manner that the program for writing data is executed by the CPU 3. Further, there may be provided a registration unit 12 to which an address map attached to the unwritten area of the data writing area of the optical disc has been registered beforehand. The registration unit 12 consists of the RAM 4b. The writing unit 11 performs data writing on the optical disc by the optical pickup 1.

Then, the CPU 3 shown in FIG. 1 executes the method of writing data into the unwritten region of the optical disc, described below, by reading out consecutively the optical disc writing program according to the present invention written in the ROM 4a.

Next, the method of writing data into the unwritten region of the optical disc according to the present invention will be described using FIGS. 2, 3(a) and 3(b). In the following description, a region into which data is written is set in a block unit, as shown in FIGS. 3(a) and 3(b). For the explanatory purpose, the designated address is indicated as X, and the address located ahead of the address X is indicated as X−1. Further, a data writing region of the optical disc corresponding to the address X is indicated as a block II, and a data writing region of the optical disc corresponding to the address X−1 is indicated as a block I. Each arrow indicates a direction to perform writing and reading to each block I, II, III, or the like. Further, it is indicated that a data writing request is given to the block I corresponding to the designated address X, and the block II corresponding to the address X−1 located ahead of the address X is a former block.

First, when an optical disc is loaded on the drive of the optical disc device, a sensor, not shown, detects that the optical disc is loaded. The CPU 3, upon receipt of a detection signal from the sensor, analyzes the whole surface of the optical disc loaded, and temporarily records in the RAM 4b (registration unit 12) address information of the written region and the unwritten region within the data writing area of the optical disc. Here, the address information of the written region and the unwritten region within the data writing area of the optical disc is registered in the RAM 4b using a bitmap format or an array format.

Figure 2:
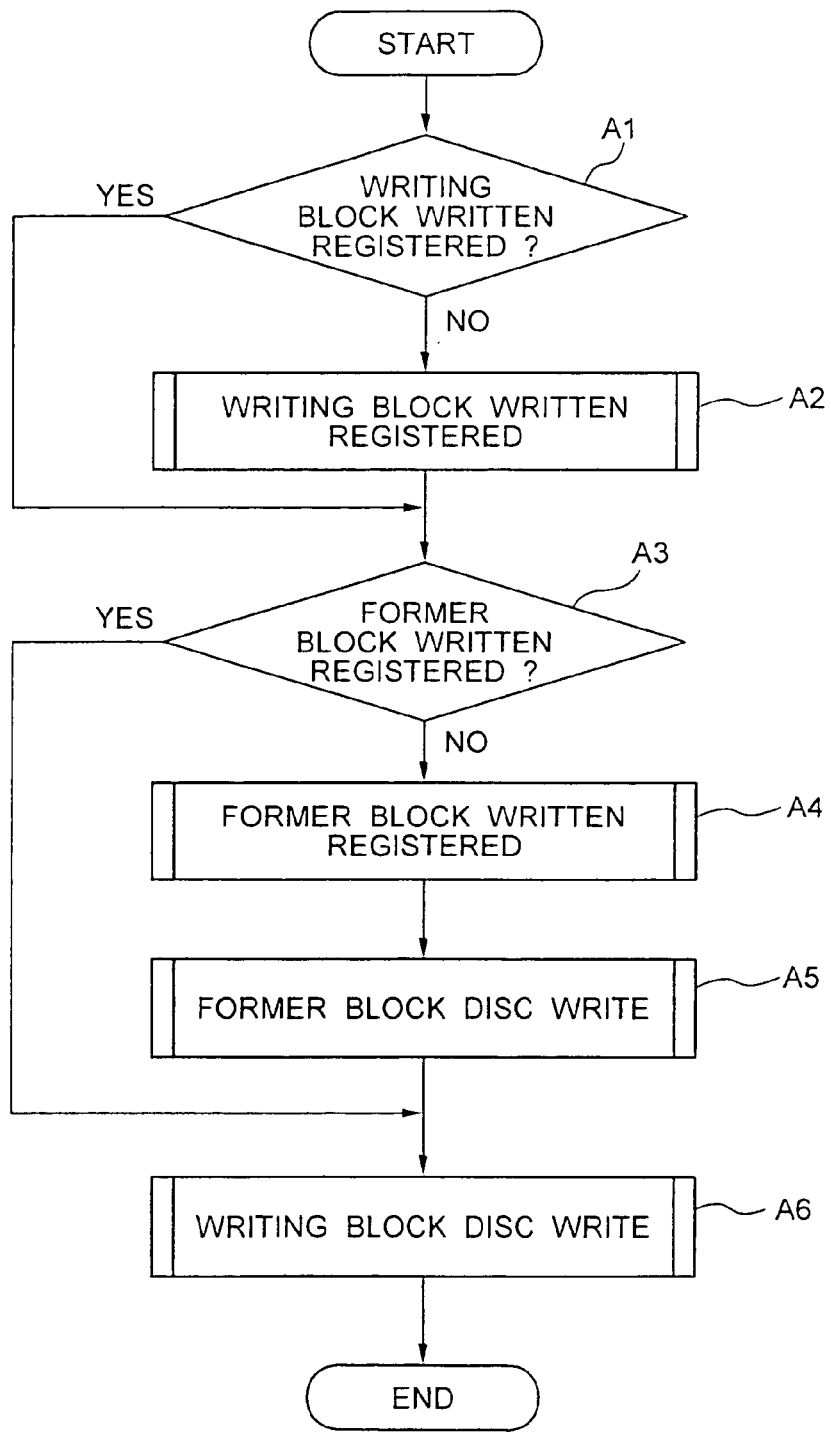
FIG. 2 is a flowchart for explaining in the order of steps a method of writing into an unwritten region of the optical disc according to the present invention by the optical disc device into which an optical disc recording program according to the embodiment of the present invention is incorporated.

In the step A1 in FIG. 2, when the CPU 3 receives from the host device 5 a request for writing data to the address X of the data writing area of the optical disc, the CPU 3 starts an operation to write data into the block II corresponding to the designated address X. Alternatively, the CPU 3 may voluntarily start a writing operation such as a physical format, for example, a background format operation, to the block II corresponding to the address X.

In the aforementioned step A1, the CPU 3, working as the judging unit 10, judges whether the designated address X is a written region or an unwritten region based on the address information registered in the RAM 4b, before starting each operation described above. If judged the block II corresponding to the address X is an unwritten region, the CPU 3 judges whether this block II has been registered in the RAM 4b as a written area. The reason why the block II is registered in the RAM 4b as a written region after it has been judged as an unwritten region is to store in the RAM 4b the fact that the block II is changed to the written region by writing data into the block II, which is the unwritten region, to thereby make it clear.

In the step A1, if judged the block II of the address X is the unwritten region, the CPU 3 changes information in the RAM 4b about the block II of the address X from an unwritten region to a written region. Then, the CPU 3 judges whether the information changed is registered in the RAM 4b. If it is not registered, the CPU 3 moves to the operation of step A2, to thereby register in the RAM 4b such information that the block II of the address X is changed to a written region. Further, if the CPU 3 judges that the information has been registered in the RAM 4b, the CPU 3 moves the processing to step A3.

Next, in the step A3, the CPU 3 judges again whether the block I of the address X−1 located ahead of the address X is a written region or an unwritten region based on the information registered in the RAM 4b.

In the step A3, if judged the block I of the address X−1 located ahead of the address X is an unwritten region, the CPU 3 changes the information about the block I of the address X−1 in the RAM 4b from an unwritten region to a written region. Then, the CPU 3 judges whether the changed information is registered in the RAM 4b (registration unit 12). If it is not registered, the CPU 3 moves to the operation of step A4 to thereby register in the RAM 4b such information that the block I of the address X−1 is changed to the written region. Further, if judged the information has registered in the RAM 4b, the CPU 3 moves the processing to step A6. Here, the aforementioned "ahead of" means a direction of approaching the optical pickup 1 of the optical disc (opposite to the arrow direction). The reason why the block I is registered in the RAM 4b as a written region after it has been judged as an unwritten region is to store in the RAM 4b the fact that the block I is changed to the written region by writing the data into the block I, which is the unwritten region, to thereby make it clearer.

After the processing described above is completed, if the CPU 3 judges the block I of the address X−1 located ahead of the address X as an unwritten region, the CPU 3 moves the processing to step A5, and performs the data writing by controlling the optical pickup 1 to a region of one block (address X−1) or regions (block I, block I−1) of more than one blocks (address X−2 and X−1) in the data writing area of the optical disc, as shown in FIG. 3(a)(i). Here, the data written in the blocks I and/or I−1 of the addresses X−1 and/or X−2 is the one with which the normal data written in the unwritten region can be surely read out.

In the step A5, when writing data into the block I or I−1, the CPU 3 performs writing of the data continuously into the block II which is an unwritten region, that is, the block II of the address X designated by the host device 5, continuing from the block I of the address X−1, or the addresses X−1 and X−2. In this case, the data may also be written into the block III of the address X+1 located behind the address X. When writing data into the address X+1, the CPU 3 registers in the RAM 4*b* such information that the address X+1 is a written region. The data written into the designated address X (the address X+1 may be included) is normal data which should be written in the data writing area of the optical disc.

The managing information of the address map of the written region and the unwritten region within the data writing area of the optical disc, which has been registered in the RAM 4*b* by the CPU 3, may be written onto the disc in an area such as a lead-in by the time the optical disc is ejected. By reading out the information when the optical disc is loaded, the address map information of the written region and the unwritten region in the data writing area of the optical disc can be obtained immediately.

Figure 3:
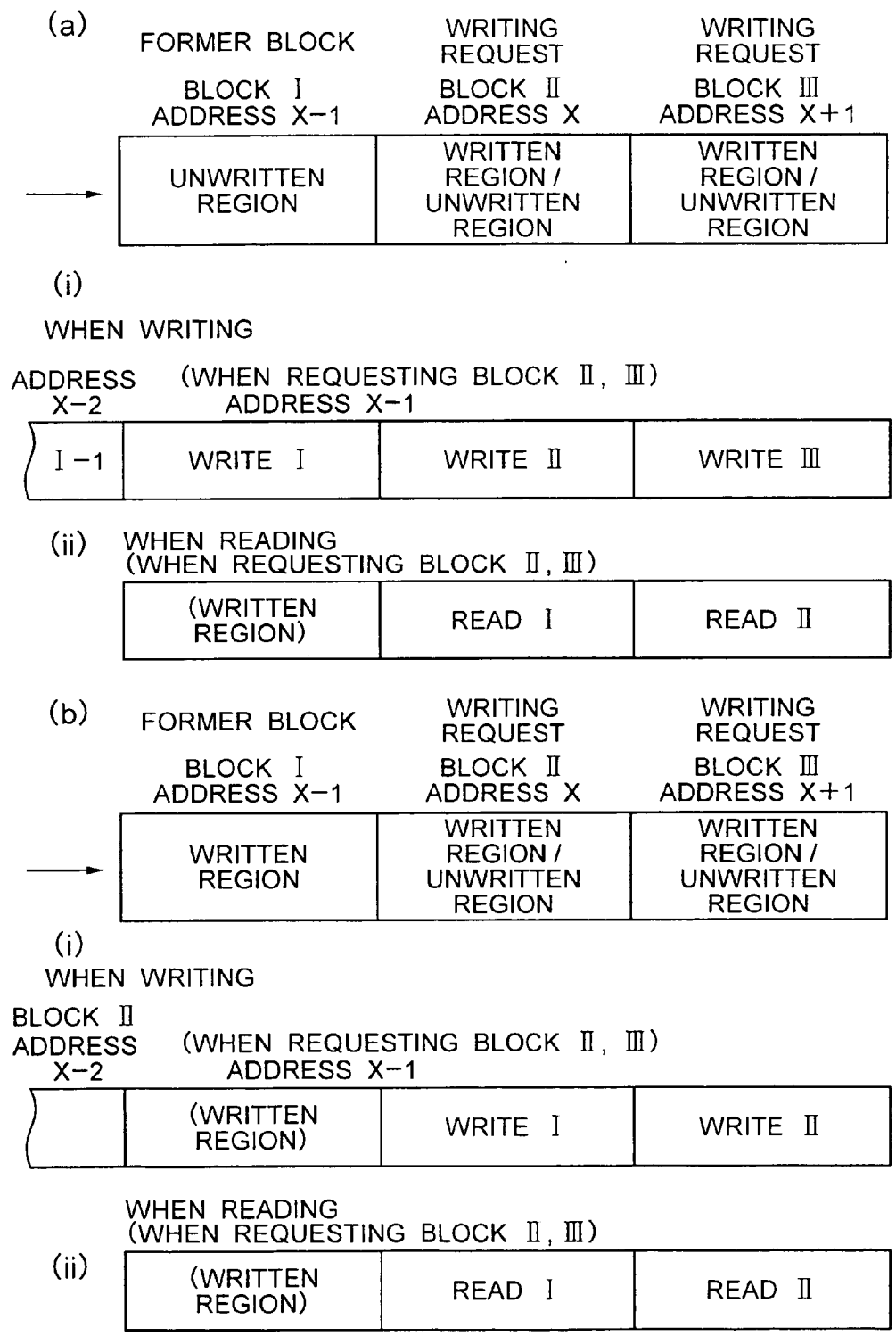
FIGS. 3(a) and 3(b) are diagrams showing the method of writing into an unwritten area of the optical disc according to the present invention.

On the other hand, in the step A1, if the CPU 3 judges that the block I of the address X−1 located ahead of the address X is a written region as shown in FIG. 3(*b*), or in the steps A3, if the CPU 3 judges that data is written in the block I of the address X−1 located ahead of the address X as shown in FIG. 3(*b*), the CPU 3 moves the processing to the step A6.

Then, in the step A6, the CPU 3, working as the writing unit 11, performs writing of the data only to the block II of the address X designated by the host device 5, as shown in FIG. 3(*b*) (*i*). Here, the CPU 3 may write data into the block III of the address X+1 located behind the address X, as same as the case of the block II, as described above.

During performing the aforementioned processing or at the stage of it being completed, the data, written in the block I of the address X−1 located ahead of the designated address X or in the blocks including the block I−1 of the address X−2, is data for reading out the normal data written in the block II of the designated address. Therefore, in a case that the normal data is written in the addresses X−1 and X−2, there is no problem in reading out the data of the designated address X, since the block I of the address X−1 located ahead of the designated address X is not an unwritten region. Thus, during performing the aforementioned processing or at the stage of it being completed, the CPU 3, according to the aforementioned processing, judges whether the block of the address located ahead of the block I of the address X−1 is an unwritten region or a written region, and by performing physical formatting or overwriting the block I of the address X−1, writes the normal data into the block I of the address X−1 as well. Thereby, the normal data is written into the whole data writing area of the optical disc.

Next, reading of the data written in the data writing area of the optical disc will be described.

There are two cases, that is, a case that data for reading out the data written in the block II of the designated address X is written in the block I of the address X−1, as shown in FIG. 3(*a*)(*ii*), and a case that the normal data is written in the block I of the address X−1, as shown in FIG. 3(*b*)(*ii*). As data for reading out the data, dummy data is used.

In either of the aforementioned cases, the CPU 3 reads out from the RAM 4*b* address information of the block I of the address X−1 located ahead of the block II of the designated address X to which a reading request is output from the host device 5. Then, the CPU 3 searches for the block I located ahead of the block II of the designated address X based on the current location information obtained from the address data in the wobble and based on the information about the address X−1 of the former block I read out from the RAM 4*b*.

Next, the CPU 3 causes, by the tracking unit 2, the optical pickup 1 to access the address X designated as the data writing area on the optical disc while synchronizing with the address X−1 of the former block I. Then, the CPU 3 reads out the data written in the block II of the designated address X using the optical pickup 1. In other words, the data provided from the host device is demodulated starting from the region of the address ahead of the address designated for writing into the data writing area. In a case of demodulating the data provided from the host device, if the data from the host device is written following the dummy data written in the region of the address located ahead of the designated address, the data is read out starting from the head position of the dummy data. Thereby, based on the difference between the reference position (wobble) of the optical disc and the head position of the data from the host device, timing lag generated when demodulating the data on the rotating optical disc is corrected. With this correction processing, the data provided from the host device is demodulated.

More specifically, the region of the address X−1, in which the dummy data has been written, is accessed as shown in FIG. 3. Then, the data of the address X−1 embedded in the wobble and the address data included in the dummy data are read out. Here, if there is a timing lag generated when the data is demodulated on the rotating optical disc, the timing lag is detected based on the difference between the reference position (wobble) and the head position of the data provided from the host device, and the detected timing lag is corrected. Thereby, the wobble and the head position of the data of the address X coincide with each other within the allowable range. The correction of the timing lag is performed by reading out the data starting from the dummy data of the address X−1, by the time of reading out the data provided from the host device written in the next address X.

As described above, the wobble and the head position of the data of the address X coincide with each other within the allowable range. Thereby, the data which is provided from the host device and written following the dummy data can be demodulated accurately.

Other Embodiments

In the aforementioned embodiment, the data writing area of the optical disc is analyzed and the information about the address map attached to the unwritten region of the data writing area is obtained. However, the present invention is not limited to this structure. That is, a controlling method in which, when data is written into the block of the designated address, RF (Radio Frequency) data is detected before judging whether the block of the address X−1 located ahead of the address X is in the written state or in the unwritten state, and if the state of no RF data is detected, the processing moves to control processing for writing the normal data into the block of the address X starting from the block of the address X−1, whereby it is switched to automatically start the writing of data into the block of the address X−1 and the writing of the normal data into the block of the designated address X.

Figure 4:
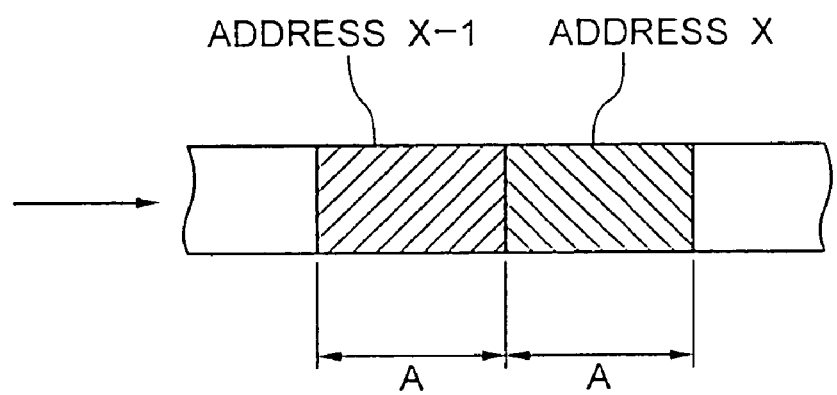
FIG. 4 is a diagram showing the method of writing into an unwritten area of the optical disc according to the present invention.
Figure 5:
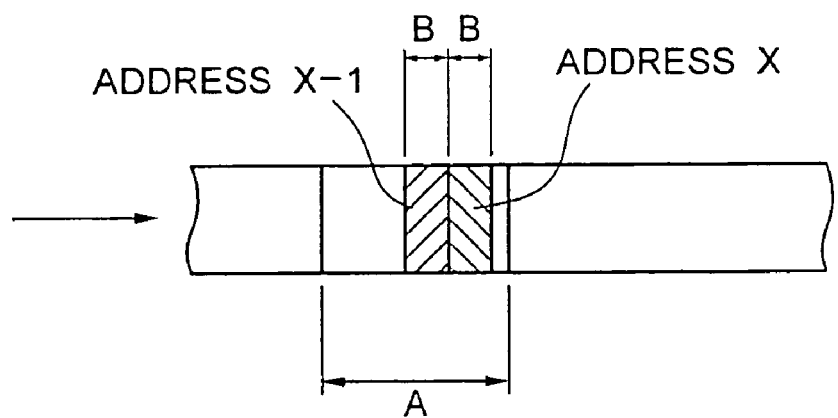
FIG. 5 is a diagram showing the method of writing into an unwritten area of the optical disc according to the present invention.

Further, in the aforementioned embodiment, the data writing area of the optical disc is divided by a block unit A and the data is written in integral multiple of the block unit A as shown in a frame format in FIG. 4. However, the present invention is not limited to this structure. The data writing area of the optical disc may divided by a byte unit B and the data may be written in integral multiple of the byte unit B, as shown in FIG. 5.

Further, data may be written into the unwritten region of the address X−1 located ahead of the designated address X in a block unit or in a byte unit.

Effects

According to the present invention, when data is written into a region corresponding to the designated address, the data is also written into an unwritten region located ahead of the region, as described above. Therefore, when the data in the region corresponding to the designated address is read out, the data written in the region of the designated address can be secured to be taken by being synchronized with, for example, the frame SYNC which is synchronization information of the data written on the optical disc, whereby a correction of data such as an ECC can be surely performed.

What is claimed is:

1. A method of writing into an unwritten region of an optical disc for writing data, provided from a host device, into a data writing area of the optical disc, comprising:
    a judging step for judging whether an address located ahead of a designated address for writing data is an unwritten region or a written region; and
    a writing step for writing data into the data writing area of the optical disc based on a judgment result of the judging step; wherein
    in the writing step, if the address located ahead of the designated address is judged as a written region, data writing is performed starting from a region of the designated address, and if the address located ahead of the designated address is judged as an unwritten region, dummy data is written into a region of an address located ahead of the designated address, and continuously, the data provided from the host device is written into the region of the designated address.

2. The method of writing into an unwritten region of an optical disc, as claimed in claim 1, wherein a region for writing the data is set in a block unit.

3. The method of writing into an unwritten region of an optical disc, as claimed in claim 1, wherein a region for writing the data is set in a bit unit.

4. The method of writing into an unwritten region of an optical disc, as claimed in claim 1, wherein the data is written in a byte unit into the unwritten region of the address located ahead of the designated address.

5. The method of writing into an unwritten region of an optical disc, as claimed in claim 1, wherein the data is written in a block unit into the unwritten region of the address located ahead of the designated address.

6. A method of writing into an unwritten region of an optical disc for writing data, provided from a host device, into a data writing area of the optical disc, comprising:
    a judging step for judging whether an address located ahead of a designated address for writing data is an unwritten region or a written region; and
    a writing step for writing data into the data writing area of the optical disc based on a judgment result of the judging step; wherein
    in the writing step, if the address located ahead of the designated address is judged as a written region, data writing is performed starting from a region of the designated address, and if the address located ahead of the designated address is judged as an unwritten region, data including at least one of a synchronizing signal or address information is written into a region of an address located ahead of the designated address, and continuously, the data provided from the host device is written into the region of the designated address.

7. The method of writing into an unwritten region of an optical disc, as claimed in claim 6, wherein a region for writing the data is set in a block unit.

8. The method of writing into an unwritten region of an optical disc, as claimed in claim 6, wherein a region for writing the data is set in a bit unit.

9. The method of writing into an unwritten region of an optical disc, as claimed in claim 6, wherein the data is written in a byte unit into the unwritten region of the address located ahead of the designated address.

10. The method of writing into an unwritten region of an optical disc, as claimed in claim 6, wherein the data is written in a block unit into the unwritten region of the address located ahead of the designated address.

11. A method of writing into an unwritten region of an optical disc for writing data, provided from a host device, into a data writing area of the optical disc, comprising:
    a registering step for registering beforehand an address map attached to an unwritten region of the data writing area;
    a judging step for judging whether an address located ahead of a designated address for writing data is an unwritten region or a written region; and
    a writing step for writing data into the data writing area of the optical disc based on a judgment result of the judging step; wherein
    in the writing step, if the address located ahead of the designated address is judged as a written region, data writing is performed starting from a region of the designated address, and if the address located ahead of the designated address is judged as an unwritten region, dummy data is written into a region of an address located ahead of the designated address, and continuously, the data provided from the host device is written into the region of the designated address, and
    the dummy data written in the unwritten region of the address located ahead of the designated address is physically formatted, and each time the data, which is provided from the host device and should be written into the unwritten region physically formatted, is written, the address map, attached to the unwritten region, registered in the registering step is updated.

12. A method of writing into an unwritten region of an optical disc for writing data, provided from a host device, into a data writing area of the optical disc, comprising:
    a registering step for registering beforehand an address map attached to an unwritten region of the data writing area;
    a judging step for judging whether an address located ahead of a designated address for writing data is an unwritten region or a written region; and
    a writing step for writing data into the data writing area of the optical disc based on a judgment result of the judging step; wherein
    in the writing step, if the address located ahead of the designated address is judged as a written region, data writing is performed starting from a region of the designated address, and if the address located ahead of the designated address is judged as an unwritten region, data including at least one of a synchronizing signal or address information is written into a region of an address located ahead of the designated address, and continuously, the data provided from the host device is written into the region of the designated address, and
    the data including at least one of the synchronizing signal or the address information written in the unwritten region of the address located ahead of the designated address is physically formatted, and each time the data, which is provided from the host device and should be written into the unwritten region physically formatted, is written, the address map, attached to the unwritten region, registered in the registering step is updated.

13. An optical disc writing device for writing data, provided from a host device, into a data writing area of the optical disc, comprising:
 a judging unit for judging whether an address located ahead of a designated address for writing data is an unwritten region or a written region; and
 a writing unit for writing data into the data writing area of the optical disc based on a judgment result by the judging unit; wherein
 the writing unit performs: if the address located ahead of the designated address is judged as a written region, data writing starting from a region of the designated address; and if the address located ahead of the designated address is judged as an unwritten region, writing of dummy data into a region of an address located ahead of the designated address, and continuously, writing of the data provided from the host device into the region of the designated address.

14. An optical disc writing device for writing data, provided from a host device, into a data writing area of the optical disc, comprising:
 a judging unit for judging whether an address located ahead of a designated address for writing data is an unwritten region or a written region; and
 a writing unit for writing data into the data writing area of the optical disc based on a judgment result by the judging unit; wherein
 the writing unit performs: if the address located ahead of the designated address is judged as a written region, data writing starting from a region of the designated address; and if the address located ahead of the designated address is judged as an unwritten region, writing of data including at least one of a synchronizing signal or address information into a region of an address located ahead of the designated address, and continuously, writing of the data provided from the host device into the region of the designated address.

15. An optical disc device equipped with a program for writing data on an optical disc, with which data provided from a host device is written into a data writing area of an optical disc, wherein the program, when executed by a computer causes the computer, to perform:
 judging processing to judge whether an address located ahead of a designated address for writing data is an unwritten region or a written region; and
 writing processing to write the data into the data writing area of the optical disc, based on a judgment result of the judging processing; and
 in the writing processing, if the address located ahead of the designated address is judged as a written region, data writing is performed starting from a region of the designated address, and if the address located ahead of the designated address is judged as an unwritten region, dummy data is written into a region of an address located ahead of the designated address, and continuously, the data provided from the host device is written into the region of the designated address.

16. An optical disc device equipped with a program for writing data on an optical disc, with which data provided from a host device is written into a data writing area of an optical disc, wherein the program, when executed by a computer, causes the computer to perform:
 judging processing to judge whether an address located ahead of a designated address for writing data is an unwritten region or a written region; and
 writing processing to write the data into the data writing area of the optical disc, based on a judgment result of the judging processing; and
 in the writing processing, if the address located ahead of the designated address is judged as a written region, data writing is performed starting from a region of the designated address, and if the address located ahead of the designated address is judged as an unwritten region, data including at least one of a synchronizing signal or address information is written into a region of an address located ahead of the designated address, and continuously, the data provided from the host device is written into the region of the designated address.

* * * * *